(12) United States Patent
Miyauchi

(10) Patent No.: US 11,695,928 B2
(45) Date of Patent: Jul. 4, 2023

(54) DIVIDING PATTERN DETERMINATION DEVICE CAPABLE OF REDUCING AMOUNT OF COMPUTATION, DIVIDING PATTERN DETERMINATION METHOD, LEARNING DEVICE, LEARNING METHOD, AND STORAGE MEDIUM

(71) Applicant: CANON KABUSHIKI KAISHA, Tokyo (JP)

(72) Inventor: Dai Miyauchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/234,609

(22) Filed: Apr. 19, 2021

(65) Prior Publication Data

US 2021/0334603 A1    Oct. 28, 2021

(30) Foreign Application Priority Data

Apr. 28, 2020 (JP) ................................. 2020-079325

(51) Int. Cl.
| | | |
|---|---|---|
| G06K 9/62 | (2022.01) | |
| G06K 9/20 | (2006.01) | |
| G06K 9/46 | (2006.01) | |
| G06N 3/08 | (2023.01) | |
| H04N 19/96 | (2014.01) | |
| H04N 19/30 | (2014.01) | |
| H04N 19/119 | (2014.01) | |
| G06N 3/084 | (2023.01) | |

(Continued)

(52) U.S. Cl.
CPC ......... *H04N 19/119* (2014.11); *G06F 18/213* (2023.01); *G06F 18/2193* (2023.01); *G06N 3/084* (2013.01); *G06V 10/22* (2022.01);

*G06V 10/40* (2022.01); *G06V 10/7715* (2022.01); *G06V 10/7796* (2022.01); *H04N 19/30* (2014.11); *H04N 19/96* (2014.11)

(58) Field of Classification Search
CPC .... G06K 9/6265; G06K 9/6232; H04N 19/30; H04N 19/96; G06V 10/40; G06V 10/22; G06N 3/084
See application file for complete search history.

(56) References Cited

U.S. PATENT DOCUMENTS

| | | | |
|---|---|---|---|
| 2019/0228285 A1* | 7/2019 | Zhang | .................... G06N 3/044 |
| 2020/0167632 A1* | 5/2020 | Kim | ....................... G06F 7/4876 |
| 2020/0329233 A1* | 10/2020 | Nemirofsky | ......... H04N 19/136 |

FOREIGN PATENT DOCUMENTS

| | | | | |
|---|---|---|---|---|
| CN | 108495129 A | * | 3/2018 | |
| CN | 108495129 A | * | 9/2018 | ........... H04N 19/103 |

(Continued)

*Primary Examiner* — Zaihan Jiang
(74) *Attorney, Agent, or Firm* — Canon U.S.A., Inc. IP Division

(57) ABSTRACT

A dividing pattern determination device capable of reducing the amount of computation performed when determining a dividing pattern of an image. An image for which a dividing pattern is expressed by a hierarchical structure for each predetermined area is input to a feature extraction section, and the feature extraction section generates, based on the input image, for the predetermined area, a hierarchy map in which a value indicative of a block size is associated with each of a plurality of blocks in the predetermined area. A determination section determines a dividing pattern of the image based on the generated hierarchy map.

15 Claims, 16 Drawing Sheets

(51) Int. Cl.
 *G06V 10/22* (2022.01)
 *G06V 10/40* (2022.01)
 *G06F 18/21* (2023.01)
 *G06F 18/213* (2023.01)
 *G06V 10/77* (2022.01)
 *G06V 10/778* (2022.01)

(56) References Cited

FOREIGN PATENT DOCUMENTS

| | | | | |
|---|---|---|---|---|
| CN | 111127521 | * | 12/2019 | |
| CN | 111127521 | * | 5/2020 | |
| CN | 112347822 A | * | 2/2021 | ......... G06K 9/00362 |
| JP | 2018182531 A | | 11/2018 | |

* cited by examiner

FIG. 3A FIG. 3B FIG. 3C FIG. 3D FIG. 3E FIG. 3F

*FIG. 10A*  *FIG. 10B*  *FIG. 10C*

FIG. 11

| BEFORE INCONSISTENCY CORRECTION | | | INCONSISTENT STATE | AFTER INCONSISTENCY CORRECTION | | |
|---|---|---|---|---|---|---|
| 64 × 64 | 32 × 32 | 16 × 16 | | 64 × 64 | 32 × 32 | 16 × 16 |
| TO BE DIVIDED | TO BE DIVIDED | TO BE DIVIDED | CONSISTENCY | – | – | – |
| | | NOT TO BE DIVIDED | CONSISTENCY | – | – | – |
| | NOT TO BE DIVIDED | TO BE DIVIDED | INCONSISTENCY | TO BE DIVIDED | TO BE DIVIDED | TO BE DIVIDED |
| | | NOT TO BE DIVIDED | CONSISTENCY | – | – | – |
| NOT TO BE DIVIDED | TO BE DIVIDED | TO BE DIVIDED | INCONSISTENCY | TO BE DIVIDED | TO BE DIVIDED | TO BE DIVIDED |
| | | NOT TO BE DIVIDED | INCONSISTENCY | TO BE DIVIDED | TO BE DIVIDED | TO BE DIVIDED |
| | NOT TO BE DIVIDED | TO BE DIVIDED | INCONSISTENCY | TO BE DIVIDED | TO BE DIVIDED | NOT TO BE DIVIDED |
| | | NOT TO BE DIVIDED | CONSISTENCY | – | – | – |

–: NO EXECUTION OF INCONSISTENCY CORRECTION

FIG. 14
 64 x 64 PIXELS SPECIFIC LAYER FEATURE MAP
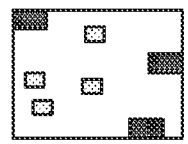 32 x 32 PIXELS SPECIFIC LAYER FEATURE MAP
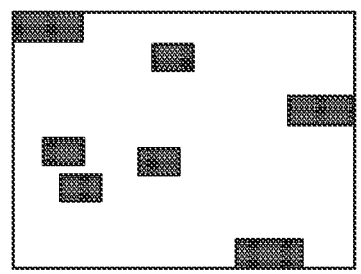 16 x 16 PIXELS SPECIFIC LAYER FEATURE MAP
☐ : NOT TO BE DIVIDED
■ : PIXELS EXCLUDED FROM OBJECT TO BE COMPUTED ＃ DIVIDING PATTERN DETERMINATION DEVICE CAPABLE OF REDUCING AMOUNT OF COMPUTATION, DIVIDING PATTERN DETERMINATION METHOD, LEARNING DEVICE, LEARNING METHOD, AND STORAGE MEDIUM

BACKGROUND OF THE DISCLOSURE

Field of the Disclosure

The aspect of the embodiments relates to a dividing pattern determination device capable of reducing the amount of computation, a dividing pattern determination method, a learning device, a learning method, and a storage medium.

Description of the Related Art

As a standard of moving image encoding, the H. 265/ HEVC (High Efficiency Video Coding) (hereinafter referred to as the HEVC) was standardized in 2013, According to the HEVC, an image to be encoded is divided into the blocks of CTUs (Coding Tree Units) each having a size of 64×64 pixels. Then, encoding is performed on each CTU. In the HEVC, the CTU is recursively divided into CUs (Coding Units) which are units of encoding. Here, the amount of computation for determining a CU dividing pattern in each CTU becomes huge.

In view of this, for determination of a CU dividing pattern in each CTU, it is envisaged to infer the CU dividing pattern using a learning model, such as a neural network subjected to machine learning. However, there is an issue that in a case where all dividing patterns of CUs in each CTU are covered, the number of output patterns becomes huge. Further, there is an issue that when machine learning is performed, it is necessary to prepare a huge number of teacher data items in advance.

As a related art, there has been proposed a technique in Japanese Laid-Open Patent Publication (Kokai) No. 2018-182531. In the technique disclosed in Japanese Laid-Open Patent Publication (Kokai) No. 2018-182531, learning parameters for a learning model are updated when learning is performed, such that 21 output labels in a quadtree data structure become close to respective correct labels. Then, it is determined to divide CUs associated with nodes each holding a division probability exceeding a threshold value of the division probability.

In the above-described technique disclosed in Japanese Laid-Open Patent Publication (Kokai) No. 2018-182531, machine learning is performed such that the 21 output labels become close to respective correct labels. Therefore, there is an issue that the amount of computation performed to determine a dividing pattern is still large.

SUMMARY OF THE DISCLOSURE

In a first aspect of the embodiments, there is provided a device including a generation unit configured to have an image for which a dividing pattern is expressed by a hierarchical structure for each predetermined area, input thereto, and generate, based on the input image, for the predetermined area, a hierarchy map in which a value indicative of a block size is associated with each of a plurality of blocks in the predetermined area; and a determination unit configured to determine a dividing pattern of the image based on the generated hierarchy map.

In a second aspect of the embodiments, there is provided a device including a generation unit configured to have an image for which a dividing pattern is expressed by a hierarchical structure for each predetermined area, input thereto, and generate, based on a feature of the input image, for the predetermined area, a feature map indicating whether or not required to be divided, with respect to each of a plurality of blocks in the predetermined area, for each of layers of the hierarchical structure; and a determination unit configured to determine a dividing pattern of the image based on a plurality of the generated feature maps.

In a third aspect of the embodiments, there is provided a device including a generation unit configured to have an image for learning for which a dividing pattern is expressed by a hierarchical structure for each predetermined area, input thereto, and generate, based on the input image, for the predetermined area, a hierarchy map in which a value indicative of a block size is associated with each of a plurality of blocks in the predetermined area, wherein the learning device performs machine learning such that a mean squared error between teacher data associated with the image for learning and the hierarch map is reduced.

Further features of the disclosure will become apparent from the following description of exemplary embodiments (with reference to the attached drawings).

BRIEF DESCRIPTION OF THE DRAWINGS

FIGS. 3A to 3F are diagrams each showing an example of a hierarchy map in a first embodiment.

FIGS. 10A to 10C are diagrams each showing an example of an intermediate feature map generated on a layer basis for an interest CTU.

FIG. 11 is a diagram useful in explaining inconsistency correction in the third embodiment.

FIG. 14 is a diagram showing examples of pixel areas (blocks) excluded from objects to be computed each for determining a specific layer feature map.

DESCRIPTION OF THE EMBODIMENTS

The disclosure will now be described in detail below with reference to the accompanying drawings showing embodiments thereof. However, the component elements described in the following embodiment are described by way of example and are by no means intended to limit the scope of the disclosure to them alone.

Figure 1:
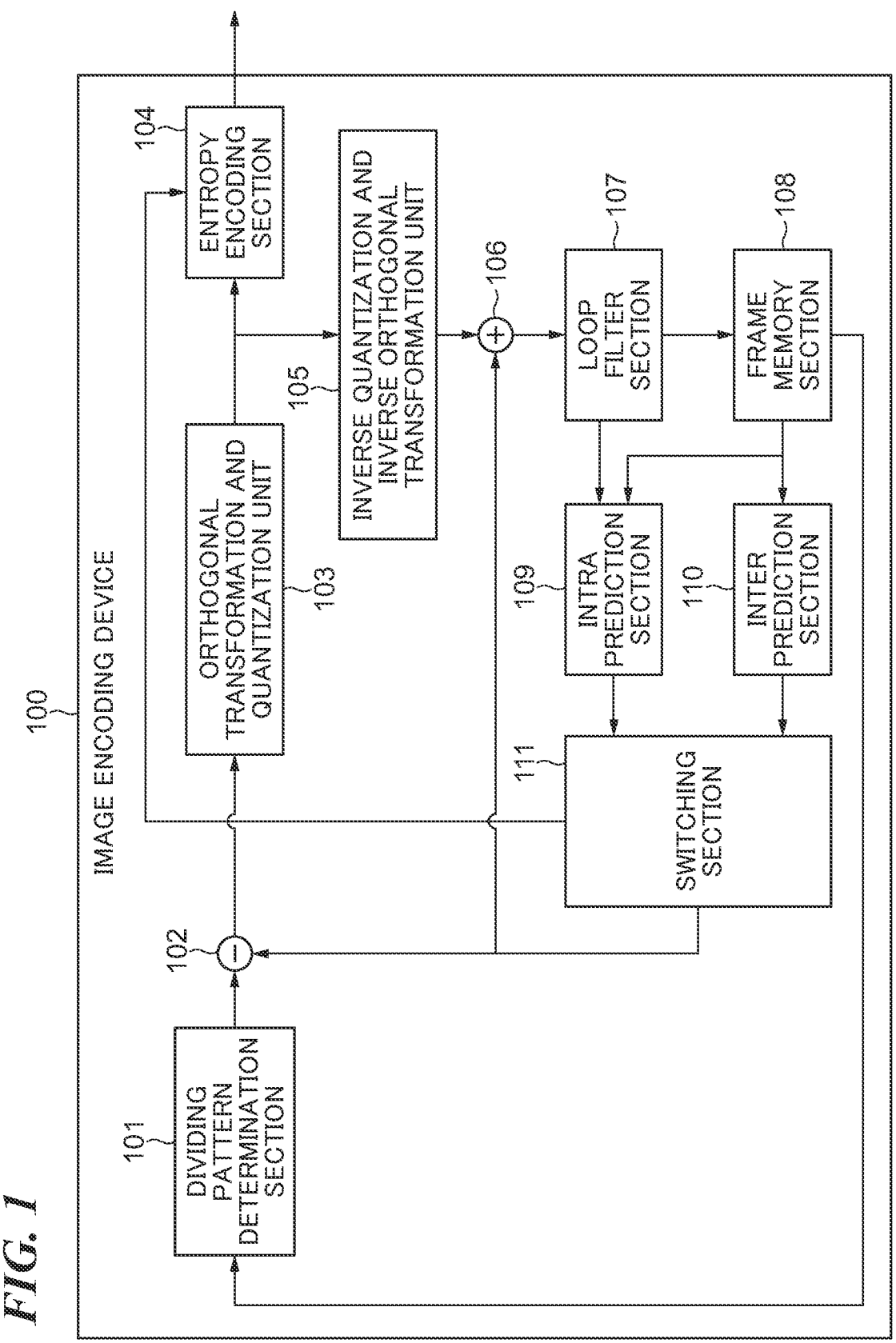
FIG. 1 is a diagram of an image encoding device.

FIG. 1 is a diagram of an image encoding device 100. The image encoding device 100 is a device configured to encode an image. In each of embodiments described hereinafter, the image encoding device 100 encodes images forming a moving image. The image encoding device 100 may be e.g. a predetermined server or computer or may be incorporated in an image capturing apparatus, a smartphone, a tablet terminal, or the like. The image encoding device 100 includes a CPU, a RAM, and a ROM. A control program stored in the ROM is loaded into the RAM and the CPU executes the control program loaded in the RAM, whereby a process in each embodiment is realized. Further, the image encoding device 100 may be realized by a predetermined programming circuit.

The image encoding device 100 encodes an image as an encoding target (encoding target image) in block units of CTUs (Coding Tree Units) each having a size of 64×64 pixels. Each CTU corresponds to a predetermined area. A dividing pattern determination section 101 determines dividing patterns for an encoding target image stored in a frame memory section 108 and generates CUs (Coding Units) recursively determined in a hierarchical structure, on a CTU-by-CTU basis.

The image encoding device 100 performs moving image encoding conforming to the H. 265 standard (HEVC standard). According to the HEVC, each CU is formed by 64×64 pixels, 32×32 pixels, 16×16 pixels, or 8×8 pixels. For example, a complicated area of an image is adjusted such that a CU associated therewith has a small size, and a flat area of the same is adjusted such that a CU associated therewith has a large size. This improves the coding efficiency in image encoding based on the HEVC, the CU is further divided into PUs (Prediction Units) as units of prediction and TUs (Transform Units) as units of transform. By adjusting the CU size and the TU size, the coding efficiency is improved. In each embodiment, it is assumed that the PU size and the TU size are uniquely determined according to the CU size. The PU sizes and the TU sizes may be determined by calculating costs for all of dividing patterns available from specifications and selecting PU sizes and TU sizes such that a lowest one of the costs is realized. Note that the encoding target image is not limited to an image to be encoded by moving image encoding conforming to the HEVC standard.

The dividing pattern determination section 101 determines a dividing pattern using coefficient parameters which have been learned in advance. The parameters updated by machine learning of a neural network are hereinafter collectively referred to as the coefficient parameters. The dividing pattern determination section 101 may be incorporated in the image encoding device 100 or may be configured as a single device. The dividing pattern determination section 101 corresponds to a dividing pattern determination device. Processing performed by the dividing pattern determination section 101 may be realized e.g. by a GPU (Graphics Processing Unit) or by cooperation performed by the CPU and the GPU. In each embodiment, the dividing pattern determination section 101 determines a dividing pattern of CUs in the CTU. Similar to the CUs, the dividing pattern determination section 101 may determine a dividing pattern for PUs and TUs as well.

A subtractor 102 calculates a difference between an image block output from the dividing pattern determination section 101 and a prediction image output from a switching section 111 and generates difference image data based on the calculated difference. An orthogonal transformation and quantization unit 103 performs orthogonal transformation on the generated difference image data and performs quantization of conversion coefficients which are data obtained by the orthogonal transformation to thereby generate quantized conversion coefficients. An entropy encoding section 104 performs entropy encoding, such as CAVLC (Context-based Adaptive Variable Length Coding) on the quantized conversion coefficients and outputs a processed result as the encoded data. The entropy encoding section 104 may perform entropy encoding, such as CABAC (Context-based Adaptive Binary Arithmetic Coding). Further, the entropy encoding section 104 outputs the encoded data in combination with a motion vector and an intra prediction mode which are notified from the switching section 111.

An inverse quantization and inverse orthogonal transformation unit 105 performs inverse quantization and inverse orthogonal transformation on the quantized conversion coefficients notified from the orthogonal transformation and quantization unit 103 and generates inversely converted data. An adder 106 adds the inversely converted data and the prediction image notified from the switching section 111 to thereby generate a reconstructed image. A loop filter section 107 performs filter processing on data of the reconstructed image to reduce coding distortion and generate, a filtered reconstructed image. The frame memory section 108 stores data of the filtered reconstructed image. The frame memory section 108 also stores an encoding target image as described hereinabove. The data of the filtered reconstructed image is sent to an intra prediction section 109 and used for intra prediction.

The intra prediction section 109 selects an intra prediction method based on correlation between a plurality of intra-prediction image data items generated from pixel data around the encoding target block which has been encoded and stored in the frame memory section 108 and the encoding target block. The intra prediction section 109 notifies the switching section 111 of the selected intra prediction method. An inter prediction unit 110 searches for a motion vector having a minimum difference between an original image of the encoding target image stored in the frame memory section 108 and a reference image, and notifies the switching section 111 of the motion vector found by the search. The switching section 111 selects a prediction method which is the smallest in the difference image data based on the respective prediction results output from the inter prediction unit 110 and the intra prediction unit 109. The encoded data is thus generated.

Figure 2:
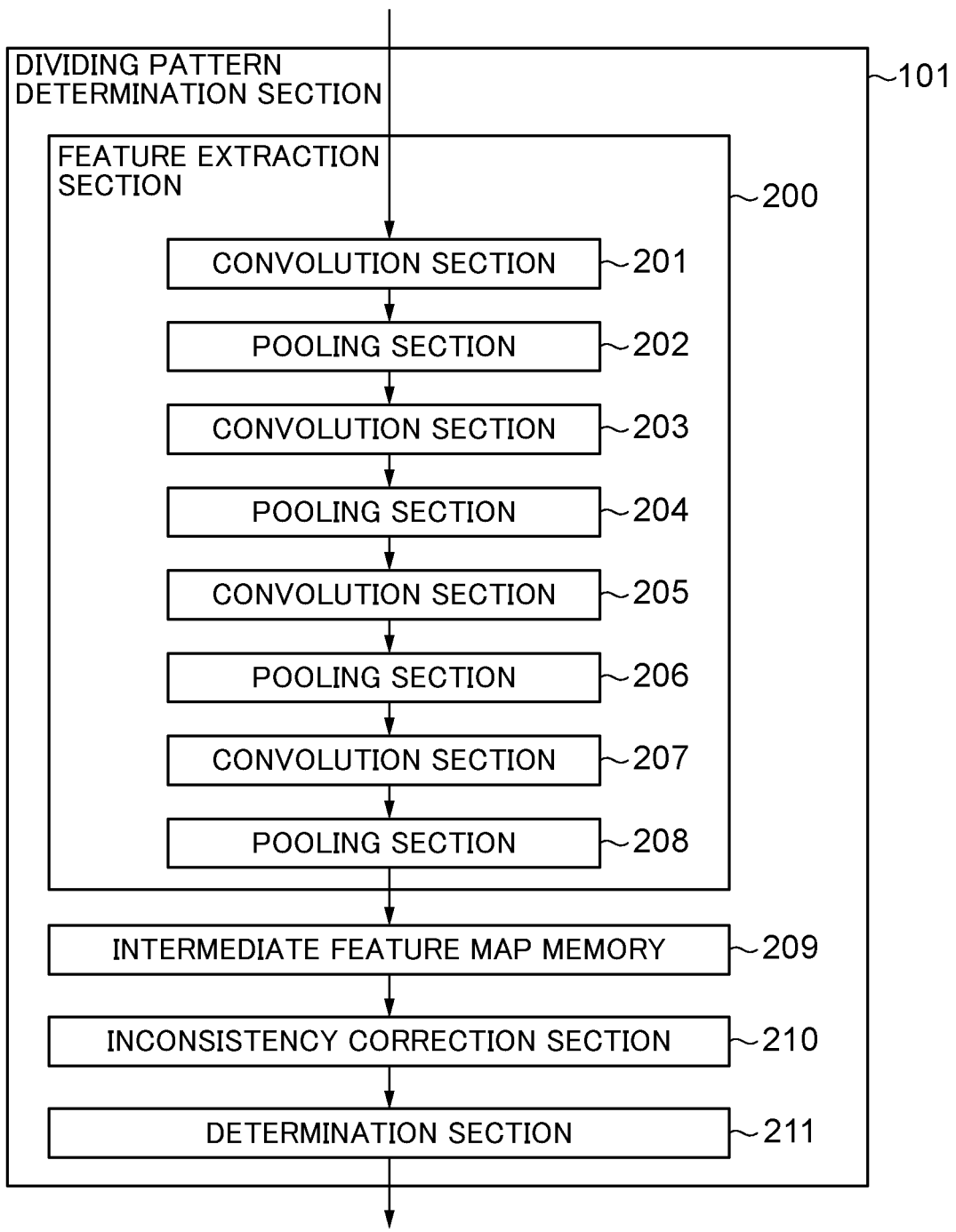
FIG. 2 is a diagram of a dividing pattern determination section.

Next, the dividing pattern determination section 101 will be described. FIG. 2 is a diagram of the dividing pattern determination section 101. A feature extraction section 200 performs filter processing based on machine learning, using the coefficient parameters which have been learned in advance. The feature extraction section 200 corresponds to a generation unit. The feature extraction section 200 may be a neural network, such as a convolutional neural network including a structure formed by alternately layering convolution sections and pooling sections. The convolution section performs a convolutional operation on an input image (encoding target image) or image feature data subjected to the convolution processing using the coefficient parameters determined by learning in advance to generate image feature data, Each pooling section performs pooling processing on the image feature data output from the convolution section associated therewith.

In the illustrated example in FIG. 2, the feature extraction section 200 is formed by convolution sections 201, 203, 205, and 207, and pooling sections 202, 204, 206, and 208. However, the numbers of the convolution sections and the pooling sections are not limited to illustrated example in FIG. 2, Each convolution section may have a plurality of filters and a plurality of convolution layers. Each pooling section is a max pooling layer that acquires a maximum value for each unit of 2×2 pixels but is not limited to the max pooling layer. Further, the feature extraction section 200 is not required to include pooling sections. An intermediate feature map memory 209 stores intermediate feature maps generated by the feature extraction section 200. Each intermediate feature map is a hierarchy map before inconsistency correction. An inconsistency correction section 210 as a correction unit corrects inconsistent data of each intermediate feature map on a CTU-by-CTU basis such that a hierarchical structure for block division is established to generate a hierarchy map concerning block division.

The above-described dividing pattern determination section 101 generates dividing patterns of CUs. A resolution of an image input to the dividing pattern determination section 101 may be a desired resolution insofar as it is within a range of restriction of the memory and is not lower than the resolution of the CTU. However, it is preferable that peripheral pixels corresponding to a reception field of each convolution section of the feature extraction section 200 are convoluted with pixels of a CTU of interest (interest CTU). In this case, not only the interest CTU, but also information on the peripheral pixels therearound can be made use of, which improves the accuracy of determining a dividing pattern. The whole image of the encoding target image is input to the feature extraction section 200. Then, processing performed by each convolution section and processing performed by each pooling section are performed in the taster order. With this, the feature extraction section 200 generates hierarchy maps corresponding to the whole image of the encoding target image.

The inconsistency correction section 210 performs inconsistency correction on the intermediate feature maps stored in the intermediate feature map memory 209, for each block corresponding to a CTU of the encoding target image. Further, local memories for storing input/output data to and from each convolution section and each pooling section are provided inside each convolution section and each pooling section. However, the input/output data to and from each convolution section and each pooling section may be stored in a desired storage section. A determination section 211 as a determination unit determines a dividing pattern of CUs in each CTU based on the generated hierarchy map associated with the CTU.

Figures 3A, 3B, 3C, 3D, 3E, 3F:
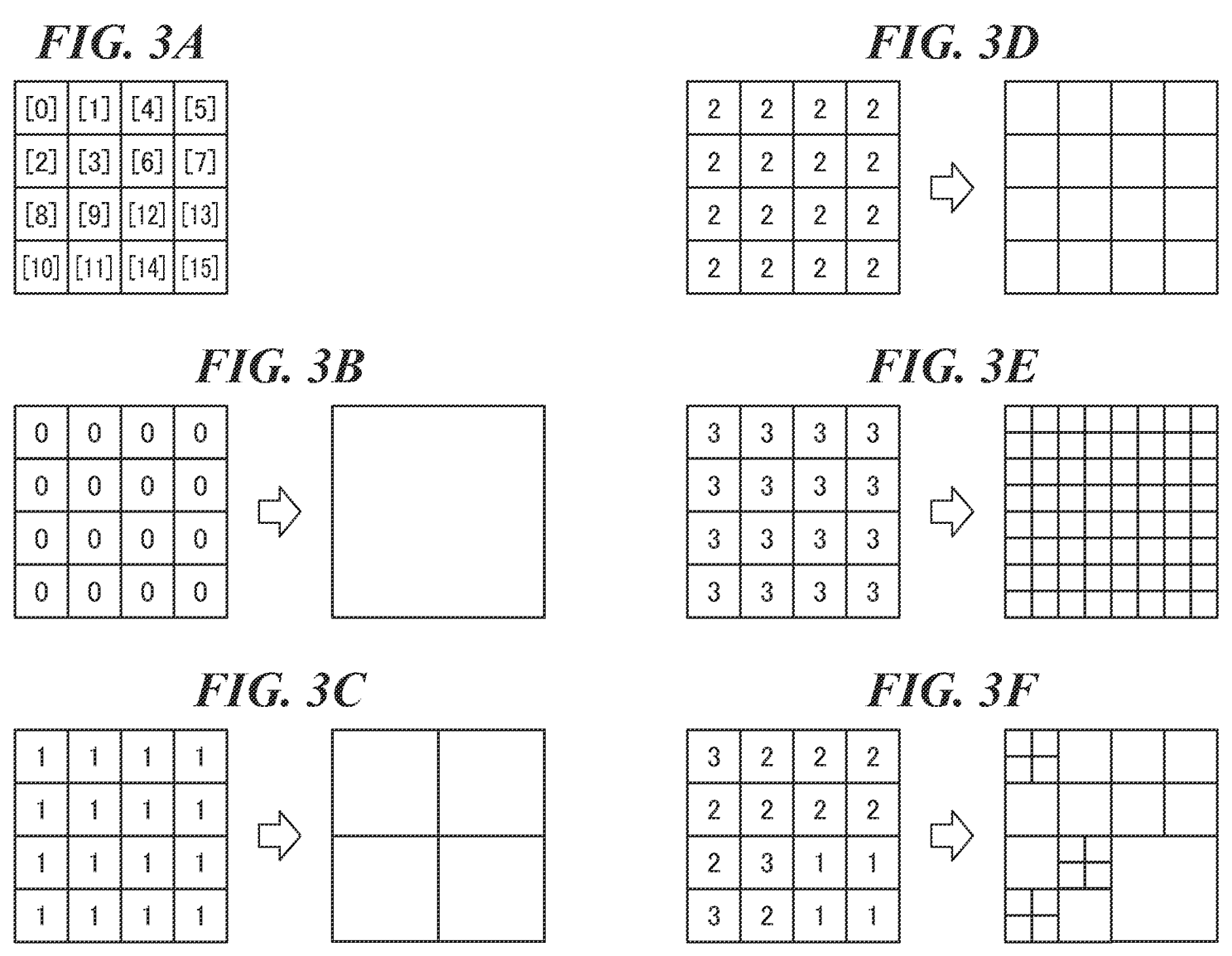

FIGS. 3A to 3F are diagrams each showing an example of the hierarchy map of a first embodiment. FIG. 3A shows a hierarchy map for one CTU. An area of interest in an interest CTU is hereinafter referred to as the interest area. The feature extraction section 200 extracts a dividing pattern feature of each area so as to determine a dividing pattern of CUs in the CTU. More specifically, the feature extraction section 200 extracts a feature indicating that the interest area of the interest CTU belongs to a block of 64×64 pixels, a block of 32×32 pixels, a block of 16×16 pixels, or a block of 8×8 pixels. A hierarchy map value is associated with one of the above-mentioned blocks. The hierarchy map value is a value indicating a layer where block division is to be performed and indicating a size of a block to be divided (block size). A value "0" indicates that the interest area belongs to a block of 64×64 pixels. A value "l" indicates that the interest area belongs to a block of 32×32 pixels. A value "2" indicates that the interest area belongs to a block of 16×16 pixels. A value "3" indicates that the interest area belongs to blocks of 8×8 pixels.

The feature extraction section 200 determines the indexes "0" to "3" as described above. Then, the dividing pattern determination section 101 calculates hierarchy map values each for one element of the hierarchy map, which corresponds to a block of 16×16 pixels, as an interest area, of an encoding target image. With this, all dividing patterns can be expressed by 2 hits. Therefore, on a CTU basis, the dividing pattern of one CTU can be expressed by 4×4 elements, i.e. a total of 16 elements.

FIGS. 3B to 3F each show an example of a correspondence relationship between a hierarchy map and a dividing pattern of each CTU. More specifically, FIGS. 3B to 3F illustrate examples of a hierarchy map of a CTU and a divided image associated therewith, respectively. In FIG. 3B, all hierarchy map values are "0", and hence "CTU=CU=64×64 pixels" holds, so that the CTU is not divided. In FIG. 3C, all hierarchy map values are "1", and hence the CTU is divided into "CUs=32×32 pixels×4". In FIG. 3D, all hierarchy map values are "2", and hence the CTU is divided into "CUs=16×16 pixels×16". In FIG. 3E, all hierarchy map values are "3", and hence the CTU is divided into "CUs=8×8 pixels×64". FIG. 3F shows an example of a dividing pattern in which different hierarchy map values are combined for one CTU. The hierarchy map is map data obtained by converting the intermediate feature map. As the teacher data used for machine learning, data having the same specifications as the hierarchy map is used.

The dividing pattern determination section 101 employs the configuration of the feature extraction section 200 having four pooling sections so as to generate a hierarchy map of 4×4 elements for a CTU. However, the configuration of the feature extraction section 200 is not limited to the illustrated example in FIG. 2. The dividing pattern determination section 101 may input an encoding target image which has been reduced in size in advance to the feature extraction section 200, or may generate a hierarchy map e.g., by calculating averages of peripheral pixels from an intermediate feature map having elements exceeding 4×4 elements per CHI Next, inconsistency correction will be described. The feature extraction section 200 is formed by a neural network, such as a convolutional neural network. The intermediate feature map is a result of filter processing itself based on coefficient parameters obtained in advance by machine learning, such as deep learning, Therefore, the intermediate feature map has decimal precision of floating-point numbers and does not necessarily match integer values of the hierarchy map. Note that operation precision of the feature extraction section 200 may be integer precision. In this case, differently from the floating-point operation, the circuit scale is reduced. These points are common between the following embodiments. The inconsistency correction section 210 converts data output from the feature extraction section 200 to values each expressed by "0", "1", "2", or "3". More specifically, the inconsistency correction section 210 converts the values of the intermediate feature map based on the following equations (1):

$$y=0 (x<0.5)$$

$$y=1 (0.5 \leq x<1.5)$$

$$y=2 (1.5 \leq x<2.5)$$

$$y=3 (2,5 \leq x) \tag{1}$$

In these equations, x represents a value output from the intermediate feature map, y represents a value of the intermediate feature map after being converted to an index value of the hierarchy map. Note that in the above equations, threshold values of x for determining y are not limited to the above-mentioned values.

Figure 4:
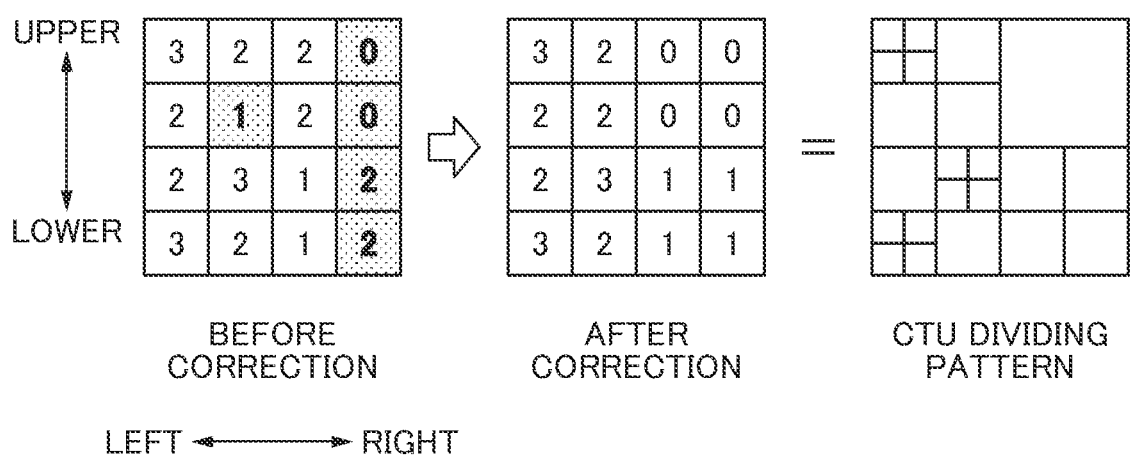
FIG. 4 is a diagram showing an example of inconsistency correction in an intermediate feature map in the first embodiment.

FIG. 4 is a diagram showing an example of inconsistency correction of an intermediate feature map in the first embodiment. The feature extraction section 200 generates one element of the hierarchy map for every block of 16×16 pixels of an encoding target image. For this reason, as shown in the map before correction in FIG. 4, there is a case where an intermediate feature map in which the hierarchical structure is not established is generated. For example, in FIG. 4, the intermediate feature map before correction has only two elements whose hierarchy map value (hereinafter sometimes referred to as the map value) is "0" in the CTU. However, to make the CTU as a CU of 64×64 pixels, the map values of 4×4 elements before correction are all required to be "0".

Further, in the intermediate feature map appearing in FIG. 4, an element whose map value is "1" and elements whose map values are not smaller than "2" exist together in a block of 2×2 elements (32×32 pixels of the encoding target image) (2×2 elements in an upper left area in the map before correction, appearing in FIG. 4). In this case, it is unclear whether to form the 2×2 elements in the upper left area before correction into a CU having 32×32 pixels or divide them into CUs each having pixels not larger than 16×16 pixels. Then, as shown in a map after correction, appearing in FIG. 4, which is a result of an inconsistency correction process described below with reference to FIG. 5, the dividing pattern determination section 101 compares the respective numbers of different map values in an interest element area, referred to hereinafter, which is sequentially moved in the intermediate feature map, and thereby generates a hierarchy map in which inconsistency has been corrected by majority decision.

Figure 5:
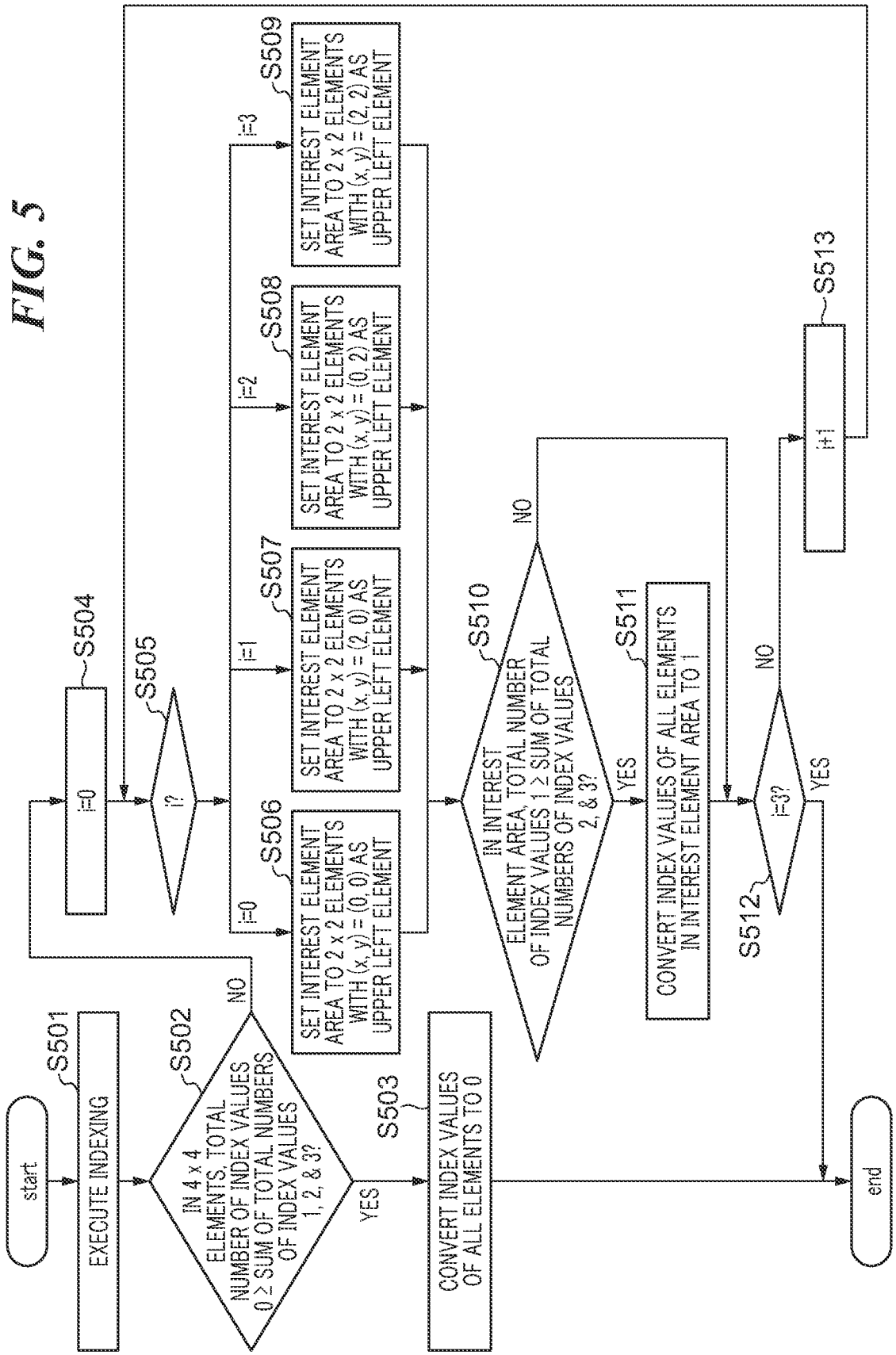
FIG. 5 is a flowchart of an inconsistency correction process performed by an inconsistency correction section of the first embodiment.

Next, the inconsistency correction process, which is performed by the inconsistency correction section 210, will be described. FIG. 5 is a flowchart of the inconsistency correction process performed by the inconsistency correction section 210, In a step S501, the inconsistency correction section 210 performs a process for converting the operation precision of data output from the feature extraction section 200 from data with decimal precision to data with integer precision, and converting the data to index values indicative of the hierarchy map values (indexing process). The inconsistency correction section 210 performs the indexing process using the above-mentioned equations (1). In a step S502, the inconsistency correction section 210 determines, with respect to the index values of 4×4 elements in the intermediate feature map corresponding to the interest CTU, whether or not the total number of index values "0" is not smaller than the sum of the respective total numbers of index values "1", "2", and "3". If the answer to the question of the step S502 is affirmative (YES), the inconsistency correction section 210 proceeds to a step S503.

In the step S503, the inconsistency correction section 210 converts all the index values of the 4×4 elements in the intermediate feature map corresponding to the interest CTU to 0. This is because it is presumed that the index values indicate that it is not required to divide the CTU. If the answer to the question of the step S502 is negative (NO), the inconsistency correction section 210 proceeds to a step S504. In the step S504, the inconsistency correction section 210 assigns "0" to a variable i (i is an integer) to initialize the variable i, Next, in a step S505, the inconsistency correction section 210 determines the value of the variable i. Then, the inconsistency correction section 210 proceeds to one of steps S506, S507, S508, and S509 according to the value of the variable i. In the following description, 2×2 elements in the intermediate feature map corresponding to 32×32 pixels of the interest CTU are denoted as an interest element area, and the interest element area is set according to the value of the variable i.

If "i 0" holds, the inconsistency correction section 210 proceeds to the step S506. In the step S506, the inconsistency correction section 210 sets the interest element area to 2×2 elements in which (x, y) (0, 0) as an upper left element. If "i=1" holds, the inconsistency correction section 210 proceeds to the step S507. In the step S507, the inconsistency correction section 210 sets the interest element area to 2×2 elements with (x, y)=(2, 0) as an upper left element. If "i 2" holds, the inconsistency correction section 210 proceeds to the step S508. In the step S508, the inconsistency correction section 210 sets the interest element area to 2×2 elements with (x, y)=(0, 2) as an upper left element. If "i=3" holds, the inconsistency correction section 210 proceeds to the step S509, In the step S509, the inconsistency correction section 210 sets the interest element area to 2×2 elements with (x, y)=(2, 2) as an upper left element. Note that the above-mentioned (x, y) represents a coordinate system in the 4×4 elements shown in FIG. 4, and an x-axis corresponds to a horizontal direction and a y-axis corresponds to a vertical direction.

In a step S510, the inconsistency correction section 210 determines, with respect to the index values in the interest element area, whether or not the total number of index values "1" is not smaller than the sum of the respective total numbers of index values "2" and "3" (step S510). If the answer to the question of the step S510 is affirmative (YES), the inconsistency correction section 210 proceeds to a step S511. In the step S511, the inconsistency correction section 210 converts the index values of all elements in the interest element area (2×2 elements) to "1", If the answer to the question of the step S510 is negative (N the inconsistency correction section 210 proceeds to a step S512 without executing the step S511. In the step S512, the inconsistency correction section 210 determines whether or not "i=3" holds.

If the answer to the question of the step S512 is affirmative (YES), the inconsistency correction section 210 terminates the inconsistency correction process in Fla 5. On the other hand, if the answer to the question of the step S512 is negative (NO), the inconsistency correction section 210 proceeds to a step S513. In the step S513, the inconsistency correction section 210 increments the value of the variable i. Here, as mentioned hereinabove, 16×16 pixels correspond to one element of the hierarchy map. For this reason, in a case where the value of the intermediate feature map is "2" or "3", inconsistency is not generated, Therefore, the inconsistency correction section 210 may correct inconsistency within a predetermined element area only in a case where "0" or "1" is included in the values in the intermediate feature map. The inconsistency correction section 210 executes the inconsistency correction process in FIG. 5, whereby a hierarchy map indicating a dividing pattern is generated from the intermediate feature map.

Although in the above-described example, CUs are of interest, the present embodiment can also be applied to a case where division is performed in a deeper layer. The inconsistency correction section 210 appropriately sets the interest element area in FIG. 5 in accordance with the position of a pixel block to be divided, and performs decision by majority, whereby it is possible to correct inconsistency. From the above, in a case where there is an element where inconsistency is generated between layers of the generated hierarchy map, the inconsistency correction section 210 corrects the inconsistency by taking elements around the element having the inconsistency into account. This makes it possible to establish the hierarchical structure even when an intermediate feature map in which the hierarchical structure is not established is generated.

Next, the machine learning of a neural network will be described. As mentioned hereinabove, the feature extraction section 200 is formed by a neural network, such as a convolutional neural network. Parameters, such as weights and biases, used for filter operation of the neural network are adjusted by inputting a large number of images for learning and performing machine learning.

Figure 6:
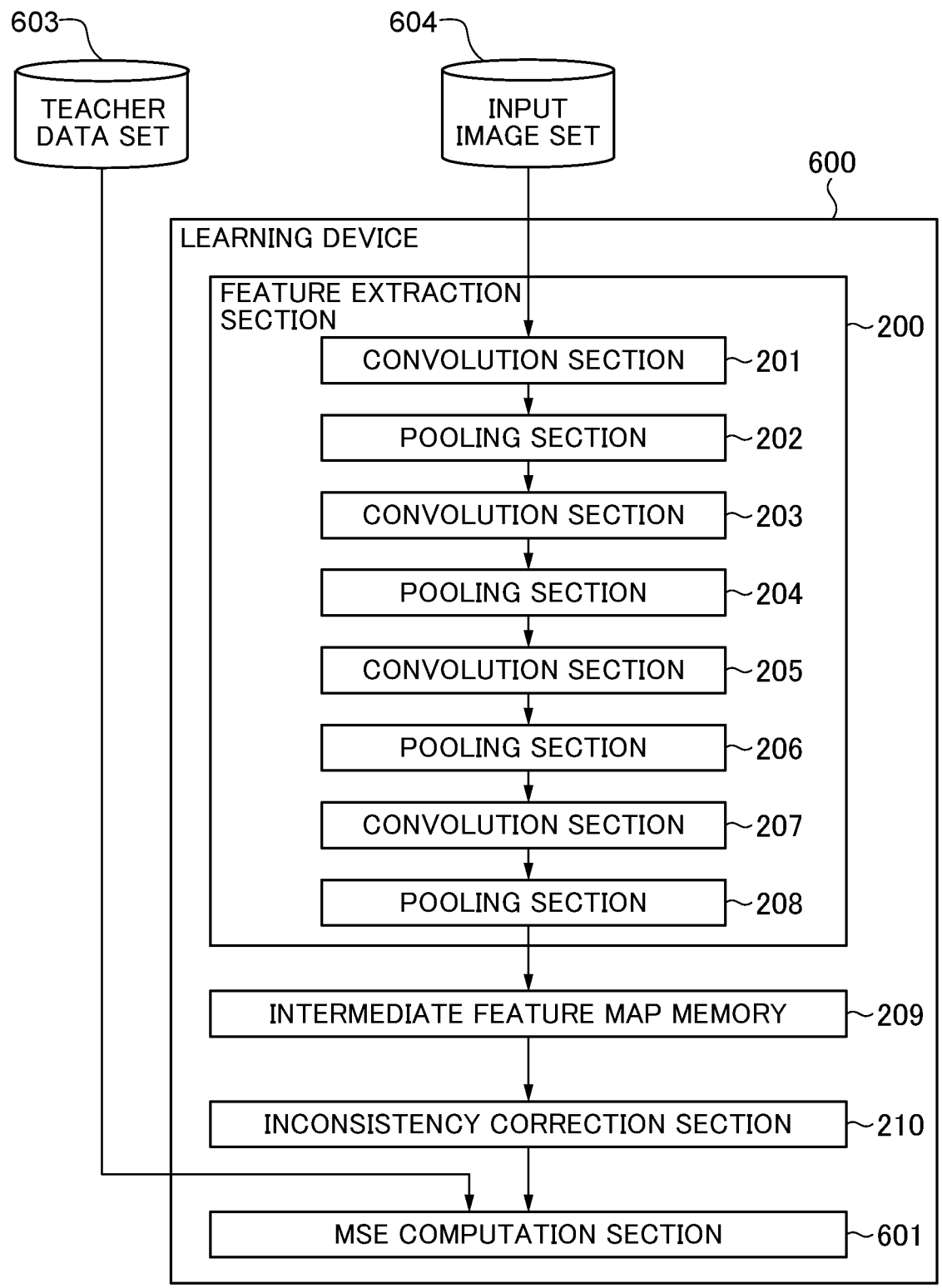
FIG. 6 is a diagram of a learning device of the first embodiment.

FIG. 6 is a diagram of a learning device 600 of the first embodiment. The learning device 600 is a device for learning the coefficient parameters for determining a dividing pattern. The feature extraction section 200, the intermediate feature map memory 209, and the inconsistency correction section 210 of the components of the learning device 600 are the same as those in FIG. 2, and hence description thereof is omitted. The learning device 600 includes not only the feature extraction section 200, the intermediate feature map memory 209, and the inconsistency correction section 210, but also an MSE computation section 601. Teacher data is input from a teacher data set 603 to the learning device 600. Further, an image for learning is input from an input image set 604 to the learning device 600. The teacher data and the input image for learning are associated with each other in one-to-one correspondence.

In each embodiment, it is assumed that a CU dividing pattern made use of for encoding, which is calculated by software when a HEVC Test Model (HM) generated by JCT-VC is used, is applied to the teacher data. The JCT-VC is an abbreviated form of Joint Collaborative Team on Video Coding. The teacher data is not limited to data calculated using the 171M. The teacher data has the same map form as the hierarchy map shown in FIGS. 3A to 3F and is hereinafter referred to as the teacher hierarchy map. To determine losses generated when machine learning is performed, the MSE computation section 601 calculates a mean squared error (MSE) between the teacher hierarchy map and a hierarchy map output from the inconsistency correction section 210.

Here, although the description is given of an example in which losses caused by machine learning are calculated on data obtained after inconsistency correction, losses caused by machine learning may be calculated on an intermediate feature map before inconsistency correction. With this, it is possible to perform computation with the floating-point precision. Further, the learning device 600 acquires a gradient which is a rate of change in the coefficient parameters by back propagation using MSE as a loss function and updates the coefficient parameters by stochastic gradient descent as a parameter optimization method. As the method of acquiring a gradient, the parameter optimization method, and so forth, in the machine learning, there may be used any other suitable method. By repeatedly performing the above-described machine learning using a large number of images, the coefficient parameters of the neural network are corrected such that they are closer to the dividing pattern of the teacher data.

Therefore, in the first embodiment, the dividing pattern determination section 101 can acquire the dividing pattern of each CTU in the image (encoding target image) as the hierarchy map in which whether or not each element area requires division is indicated. With this, compared with a case where classification is performed on a layer-by-layer basis, it is possible to reduce the amount of computation for determining a dividing pattern. Further, the dividing pattern determination section 101 performs convolution by taking information on peripheral pixels into account, with respect to classification of each CTU. Therefore, compared with a case where the information on peripheral pixels is not taken into account, it is possible to improve the accuracy of determining a dividing pattern.

Here, the learning device 600 performs machine learning of a neural network, and the generated learned neural network is supplied to the dividing pattern determination section 101 of the image encoding device 100. For example, in a case where the learning device 600 and the image encoding device 100 are different devices, the image encoding device 100 acquires the learned neural network from the learning device 600 via wired communication or wireless communication. This enables the dividing pattern determination section 101 to determine a dividing pattern using the learned neural network. In a case where the dividing pattern determination section 101 is a single device, the dividing pattern determination section 101 may acquire the learned neural network from the learning device 600.

When an unknown encoding target image is input, the learned neural network outputs an inferred hierarchy map. Further, although in the above-described example, the feature extraction section 200 uses the neural network as the learning model, a model other than the neural network may be used as the learning model. For example, a support vector machine or the like may be used as the learning model. Further, although in the above-described example, the description is given of the example of moving image encoding conforming to the HEVC, the embodiments can be applied to a desired coding method based on block division of an image forming a hierarchical structure.

Next, a second embodiment will be described. The second embodiment differs from the first embodiment in the correction method by the inconsistency correction section 210. Redundant description of the same elements as those of the first embodiment is omitted. In dividing a CTU into CUs, as the size of a divided block is smaller, an influence on image quality is larger. Therefore, as the size of a divided block is smaller, finer control can be performed. In view of this, the dividing pattern determination section 101 of the second embodiment corrects an intermediate feature map by giving higher priority to index values which divide the CTU into smaller blocks. More specifically, in a case where the index values of elements are not larger than a predetermined value (the layer is shallower than a predetermined layer), the dividing pattern determination section 101 of the second embodiment performs correction for increasing the index values (correction for deepening the layer).

Figure 7:
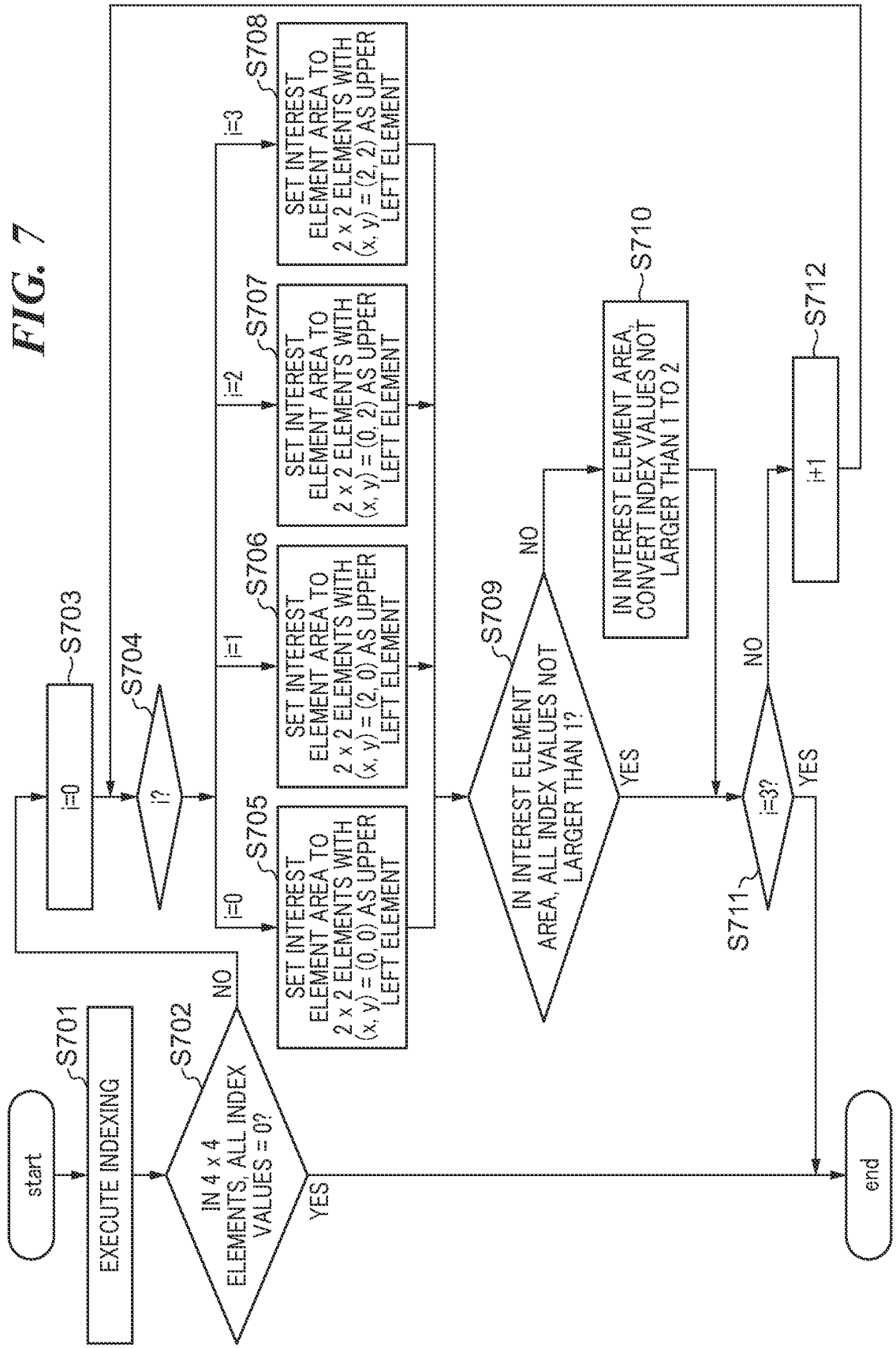
FIG. 7 is a flowchart of an inconsistency correction process performed by an inconsistency correction section of a second embodiment.

FIG. 7 is a flowchart of an inconsistency correction process performed by the inconsistency correction section 210 of the second embodiment. In a step S701, the inconsistency correction section 210 performs the same indexing process as the step S501 in FIG. 5. In a step S702, the inconsistency correction section 210 determines whether or not all of the index values of 4×4 elements of the intermediate feature map corresponding to an interest CTU are "0". If the answer to the question of the step S702 is affirmative (YES), the inconsistency correction section 210 terminates the inconsistency correction process in FIG. 7. On the other hand, if the answer to the question of the step S702 is negative (NO), the inconsistency correction section 210 proceeds to a step S703. The step S703 and steps S704 to S708 are the same as the steps S504 to S509 in FIG. 5. In a step S709, the inconsistency correction section 210 determines whether or not all index values in the interest element area are not larger than 1. If the answer to the question of the step S709 is negative (NO), the inconsistency correction section 210 proceeds to a step S710.

In the step S710, the inconsistency correction section 210 converts ones, which are not larger than "1", of the index values in the interest element area (2×2 elements) to "2". Then, the inconsistency correction section 210 proceeds to a step 711. If the answer to the question of the step S709 is affirmative (YES), the inconsistency correction section 210 directly proceeds to the step S711. The step S711 and a step S712 are the same as the steps S512 and S513 in FIG. 5.

Figure 8:
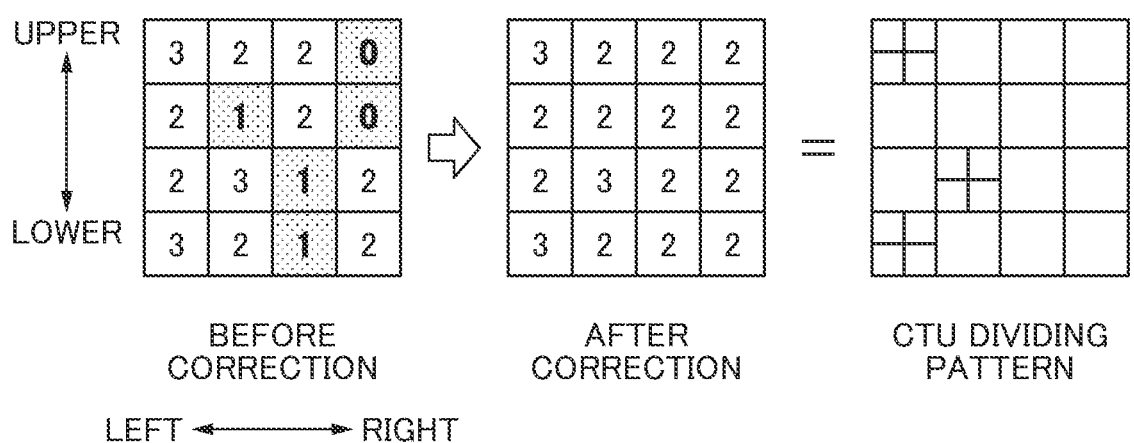
FIG. 8 is a diagram showing an example of inconsistency correction in an intermediate feature map in the second embodiment.

FIG. 8 is a diagram showing the method of correcting inconsistency in the intermediate feature map in the second embodiment. A map before correction appearing in FIG. 8 is the same as the map before correction appearing in FIG. 4. In the second embodiment, the inconsistency correction section 210 can reduce the size of divided blocks by executing the step S710. This makes it possible to perform finer control, and hence it is possible to improve the image quality of an image when encoding images forming a moving image.

Figure 9:
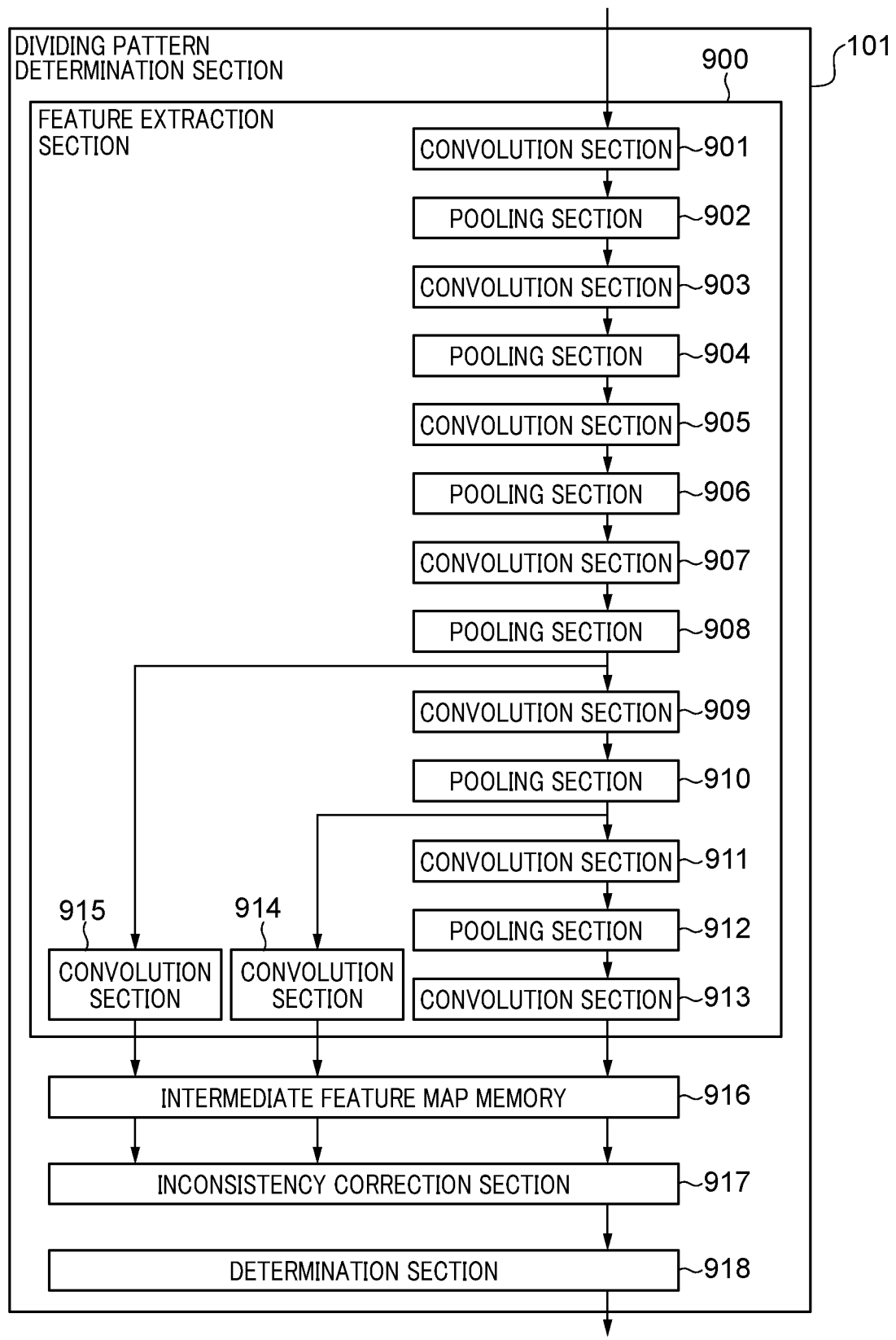
FIG. 9 is a diagram of a dividing pattern determination section of a third embodiment.

Next, a third embodiment will be described. The third embodiment differs from the first embodiment in that a plurality of intermediate feature maps are generated on a block size basis. FIG. 9 is a diagram of the dividing pattern determination section 101 of the third embodiment. A feature extraction section 900 of the third embodiment has convolution sections 901, 903, 905, 907, 909, 911, 913, 914, and 915, and pooling sections 902, 904, 906, 908, 910, and 912. The convolution sections and the pooling sections are alternately layered. Each convolution section may have a plurality of filters and convolutional layers. Similar to the first embodiment, the configuration of the feature extraction section 900 is not limited to the example appearing in FIG. 9. The feature extraction section 900 corresponds to the generation unit.

An intermediate feature map memory 916 stores a plurality of different intermediate feature maps, described hereinafter. An inconsistency correction section 917 as a correction unit corrects inconsistency data of the intermediate feature map on a CTU-by-CTU basis such that a hierarchical structure is established, to thereby generate a hierarchy map. A determination section 918 as a determination unit determines a dividing pattern of CUs in each CTU based on the generated intermediate feature map of each layer. The dividing pattern determination section 101 thus generates the CUs. The inconsistency correction process performed by the inconsistency correction section 917 is the same as that of the first embodiment.

FIGS. 10A to 10C are diagrams each showing an example of the intermediate feature map generated on a layer basis for an interest CTU. The intermediate feature map generated on a layer basis is hereinafter referred to as the specific layer feature map (feature map). FIG. 10A shows one element per CTU, which indicates whether or not required to divide a block of 64×64 pixels. FIG. 1.0B shows 4 elements in total per cm, each of which indicates whether or not required to divide a block of 32×32 pixels. FIG. 10C shows 16 elements in total per CTU, each of which indicates whether or not required to divide a block of 16×16 pixels. Each element is expressed by the value of "0" or "1", and when the value is "0", this indicates that the block associated with the element is not to be divided, whereas when the value is "1", this indicates that the block associated with element is to be divided. That is, in the third embodiment, each specific layer feature map expresses whether or not required to divide a CU of interest in 1 bit. In the third embodiment, the feature extraction section 900 performs pooling such that three specific layer feature maps have the numbers of elements shown in FIGS. 10A to 100.

Here, an output from the pooling section 908 is associated with the specific layer feature map indicating whether or not required to divide blocks of 16×16 pixels. Further, an output from the pooling section 910 is associated with the specific layer feature map indicating whether or not required to divide blocks of 32×32 pixels. An output from the pooling section 912 is associated with the specific layer feature map indicating whether or not required to divide a block of 64×64 pixels. In the third embodiment, the configuration for calculating the specific layer feature map of the minimum pixels in each layer for a CTU, by pooling processing, is employed, but the method of pooling processing is not limited to the above-described example. Further, the dividing pattern determination section 101 of the third embodiment may input an encoding target image to the feature extraction section 200 after reducing the size of the image in advance. Further, instead of handling one element of the specific layer feature map as a unit of determining whether or not required to divide a block, the dividing pattern determination section 101 may handle e.g. an average value of 4 elements of the specific layer feature map as one result of determining whether or not required to divide a block. In other words, the specific layer feature map indicating whether or not required to divide 64×64 pixels may be output at a resolution indicated in FIG. 10B or at a higher resolution.

The inconsistency correction section 917 converts output data from the feature extraction section 900 to a binary value of "0" or "1". More specifically, the inconsistency correction section 917 converts each specific layer feature map value based on the following equation (2):

$$y=0 (x<0.5) \qquad (2)$$

However, x represents a specific layer feature map value before converted to an index, and y represents a specific layer feature map value after converted to an index. Note that in the above equation, the threshold value of x for determining y is not limited to the above-mentioned value. Further, although the description is given assuming that the equation (2) is applied to the specific layer feature maps of all layers, the inconsistency correction section 917 may change the threshold value on a layer-by-layer basis.

Next, an inconsistency correction process will be described. In the third embodiment, the dividing pattern determination section 101 calculates an intermediate feature map for each layer based on the specific layer feature map. Therefore, there is a case where a block which is determined not to be divided in an upper layer is determined to be divided in a lower layer, which generates inconsistency between the layers. To solve this problem, the inconsistency correction section 917 corrects the inconsistency generated between the layers. FIG. 11 is a diagram useful in explaining inconsistency correction in the third embodiment. Referring to FIG. 11, "to be divided" corresponds to "1" as a value of the specific layer feature map after being indexed and "not to be divided" corresponds to "0" as a value of the same.

Here, to increase the coding efficiency, it is preferable to determine a block dividing pattern for encoding each of images forming a moving image, such that each of images formed by decoding the encoded images has a high image quality. Therefore, although dependent on each of images forming a moving image or a bit rate, in many cases, determination of whether or not required to divide blocks small in size has a large influence on the image quality. In view of this, the inconsistency correction section 917 of the third embodiment performs inconsistency correction by giving higher priority to the determination of whether or not required to divide blocks smaller in size than to the determination of whether or not required to divide blocks larger in size. The illustrated example in FIG. 11 indicates a result of inconsistency correction performed by giving higher priority to the determination of whether or not required to divide blocks smaller in size (blocks in the lower layer) than to the determination of whether or not required to divide blocks larger in size (block in the upper layer). That is, the inconsistency correction section 917 determines whether or not required to divide blocks larger in size based on the determination of whether or not required to divide blocks smaller in size.

More specifically, in a case where in spite of a block in the upper layer being "not to be divided", a block in the lower layer is "to be divided", the inconsistency correction section 917 determines that there is an inconsistency. In this case, the inconsistency correction section 917 performs correction to change "not to be divided" of the block in the upper layer corresponding to the block being "to be divided" in the lower layer, to "to be divided". With this, the inconsistency is corrected. For example, in FIG. 11, in a case where a block of 32×32 pixels indicates "not to be divided", and a block of 16×16 pixels indicates "to be divided", the inconsistency correction section 917 determines that there is an inconsistency. In this case, the inconsistency correction section 917 corrects "not to be divided" of the block of 32×32 pixels to "to be divided".

Figure 12:
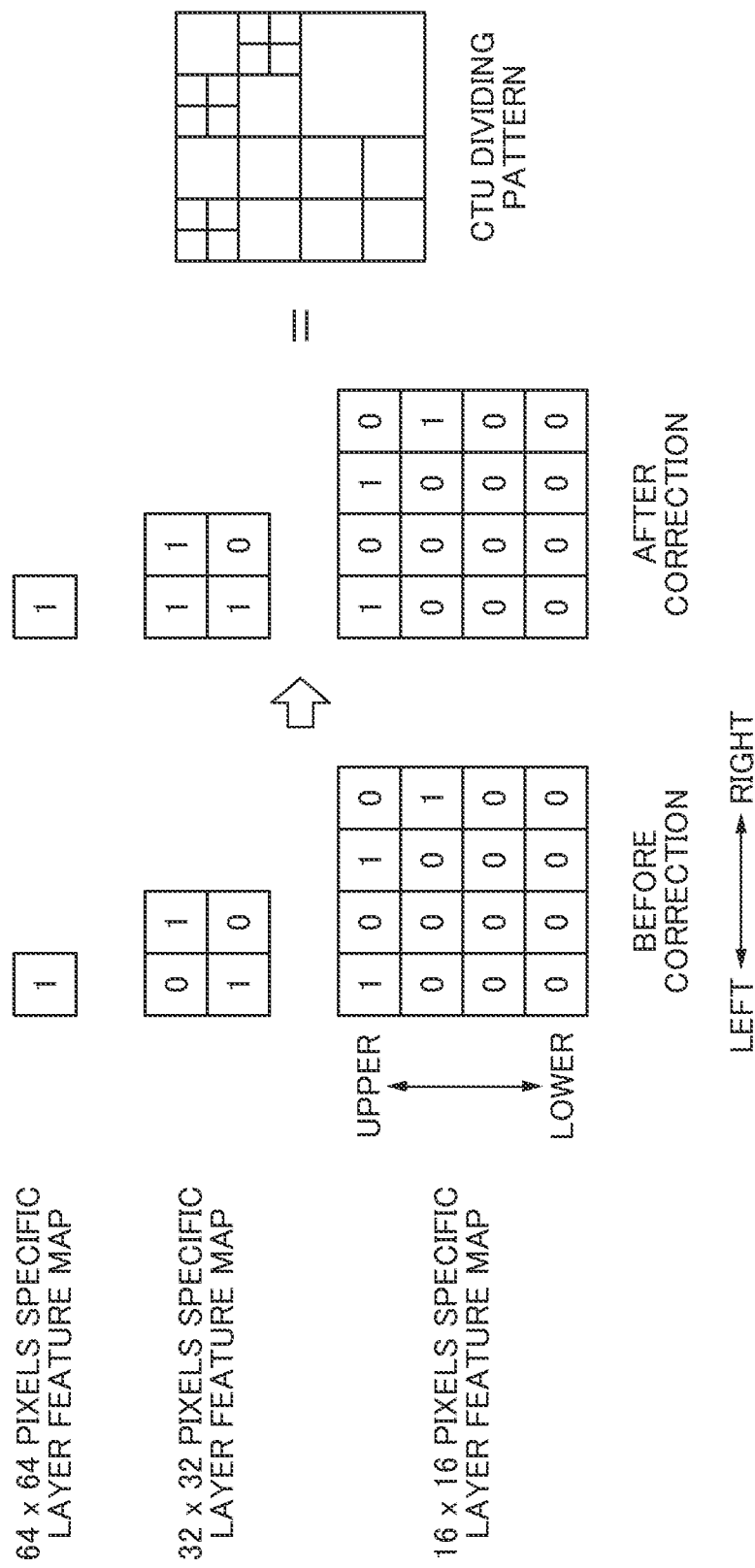
FIG. 12 is a diagram showing an example of inconsistency correction.

FIG. 12 is a diagram showing an example of inconsistency correction. Out of three layers of specific layer feature maps, a specific layer feature map of 32×32 pixels has four elements of which an upper left element before correction has a value of "0", which indicates "not to be divided". On the other hand, an upper left portion of a specific layer feature map of 16×16 pixels in the lower layer corresponds to the upper left element of the specific layer feature map of 32×32 pixels, but one (upper left one) of the four elements of the upper left portion has a value of "1", which indicates "to be divided". In this case, there is an inconsistency, and hence the inconsistency correction section 917 corrects the value of the upper left element of the specific layer feature map of 32×32 pixels to "1". This eliminates the inconsistency.

Although the inconsistency correction section 917 gives higher priority to the determination of whether or not required to divide blocks smaller in size than the determination of whether or not required to divide blocks larger in size, the inconsistency correction method is not limited to the above-described example. For example, the inconsistency correction section 917 may determine an inconsistency correction method based on a degree of image quality improvement achieved when machine learning is performed. Further, the inconsistency correction section 917 may use a PSNR (Peak Signal-to-Noise Ratio) as an index of the degree of image quality improvement. In this case, the inconsistency correction section 917 may determine an inconsistency correction method which makes it possible to enhance the image quality most, by using e.g. an HM after performing various inconsistency correction, and comparing the image quality of a decoded image using the PSNR.

Further, the inconsistency correction section 917 may perform inconsistency correction using a learning model, such as a neural network, which has been subjected to machine learning. The learning model mentioned here is different from the learning models of the first embodiment and the second embodiment. For example, the inconsistency correction section 917 may have three specific layer feature maps and an encoding target image input thereto, select a dividing pattern) correct inconsistency according to classification, and output a selection result. The accuracy of the determination of whether or not required to divide blocks is different depending on the contents of an image group as a target for determining whether or not required to be divided, and hence it is effective to determine an inconsistency correction method based on the learning model subjected to machine learning. The above-mentioned learning model used by the inconsistency correction section 917 may be subjected to machine learning by inputting three specific layer feature maps for learning and an encoding target image and using teacher data indicating which dividing pattern to correct inconsistency.

Figure 13:
FIG. 13 is a diagram showing an example of specific layer feature maps.

Next, aggregation of the corrected specific layer feature maps will be described. FIG. 13 is a diagram showing an example of the specific layer feature maps. The inconsistency correction section 917 determines a dividing pattern by converting the specific layer feature maps corrected by the inconsistency correction process to the feature maps in the forms as shown in FIGS. 3B to 3F, described in the first embodiment.

As described above, in the third embodiment, the dividing pattern determination section 101 calculates a 1-bit specific layer feature map on a layer-by-layer basis to determine whether or not required to divide blocks. With this, in a case where the feature extraction section 900 of the third embodiment is formed by a learning model, such as a neural network, the learning model is only required to infer only one of binary values indicating whether or not required to divide blocks. With this, it is possible to improve the accuracy of determination of whether or not required to divide blocks.

Next, a fourth embodiment will be described. The dividing pattern determination section 101 of the fourth embodiment has the same configuration as that of the third embodiment, shown in FIG. 9. The fourth embodiment differs from the third embodiment in the inconsistency correction method. In general, the inference accuracy of the learning model, such as a neural network, becomes lower as the amount of information of data to be inferred becomes larger. Therefore, the inference accuracy of the learning model, such as a neural network, is lower in a higher-resolution image than in a lower-resolution image. In other words, the inference accuracy of the learning model, such as a neural network, is higher in a specific layer feature map indicating whether or not required to divide blocks in a higher layer than in a specific layer feature map indicating whether or not required to divide blocks in a lower layer. Therefore, a block larger in size is easier to increase the inference accuracy, and hence the amount of computation of the convolution section 913 appearing in FIG. 9 is smaller than those of the convolution sections 914 and 915.

For this reason, the dividing pattern determination section 101 of the fourth embodiment performs inconsistency correction by giving higher priority to a specific layer feature map of blocks larger in size than a specific layer feature map of blocks smaller in size. Then, the dividing pattern determination section 101 of the fourth embodiment excludes pixel areas (blocks) of a lower layer corresponding to blocks in an upper layer, which are determined "not to be divided" in a specific layer feature map of the upper layer, from objects to be computed for a specific layer feature map of the lower layer.

Figure 15:
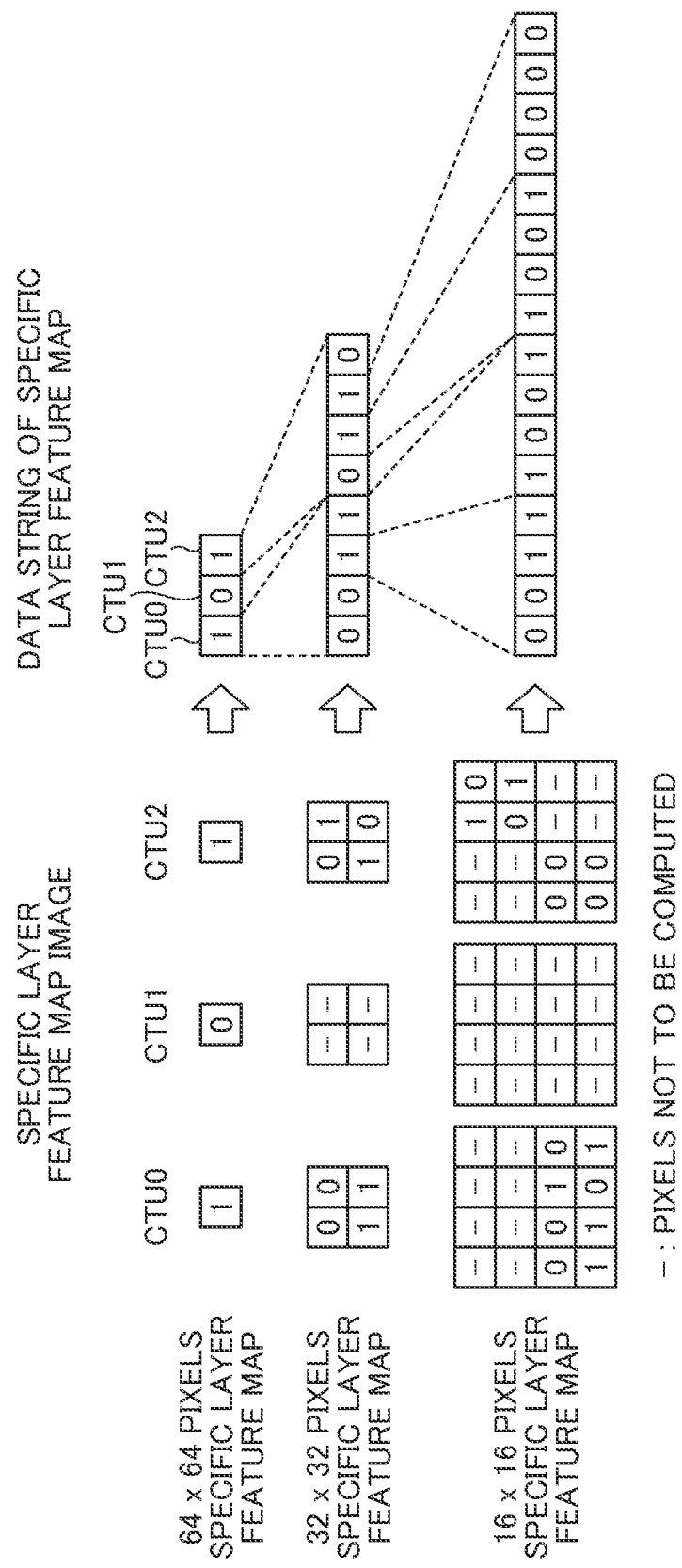
FIG. 15 is a diagram showing an example of data strings of corrected specific layer feature maps.

FIG. 14 is a diagram showing an example of pixel areas (blocks) excluded from objects to be computed for a specific layer feature map. As shown in the example in FIG. 14, the specific layer feature map of 64×64 pixels in the uppermost layer has three pixel areas (blocks) determined "not to be divided". Pixel areas (blocks) of two specific layer feature maps in lower layers corresponding to the pixel areas (blocks) determined "not to be divided" are excluded from objects to be computed. Further, pixel areas (blocks) of the specific layer feature map of a lower layer, corresponding to the pixel areas (blocks) determined "not to be divided" in the specific layer feature map of 32×32 pixels, are excluded from objects to be computed, FIG. 15 is a diagram showing an example of data strings of corrected specific layer feature maps. FIG. 15 shows specific layer feature maps of three continuous CTUs (CTU 0. CTU 1, and CTU 2) for convenience sake. As described above, in a case where an element of an upper layer is determined. "not to be divided", the dividing pattern determination section 101 excludes elements of a lower layer, corresponding to the above-mentioned element determined "not to be divided", from objects to be computed (object to be processed). As a result, computation (processing) of the elements excluded from the objects to be computed is not performed. It is unnecessary to hold values concerning the elements excluded from the objects to be computed.

Then, the dividing pattern determination section 101 generates a data string from which elements of each specific layer feature map generated for an associated layer, which are excluded from the objects to be computed, are omitted. In the data string of the specific layer feature map appearing in FIG. 15, data of pixel areas (blocks) corresponding to the omitted elements is eliminated. For example, no values are set in a specific layer feature map of 32×32 pixels and a specific layer feature map of 16×16 pixels, which correspond to the CTU 1. Accordingly, the dividing pattern determination section 101 generates a data string by skipping elements, in which no values are set, of the specific layer feature maps. This reduces the amount of data of the specific layer feature maps. Further, it is possible to identify the position of each skipped element by tracing the hierarchical structure.

As described above, in the fourth embodiment, pixel areas blocks) of elements in a lower layer corresponding to pixel areas (blocks) of elements in an upper layer which are determined "not to be divided" are not subjected to computation for a specific layer feature map. With this, compared with a case where computation is performed for all elements of the specific layer feature map of each layer, it is possible to reduce the amount of computation. For example, in a case where corresponding pixel areas (blocks) of elements in an upper layer are determined "not to be divided", the processing to be performed by the convolution sections 914 and 915, appearing in FIG. 9, can be omitted. Since the amount of computation can be reduced, it is also possible to reduce electric power. Note that the dividing pattern determination section 101 may be configured such that the feature extraction section 900 that generates each specific layer feature map is independently provided for each layer. This makes it possible to further reduce the amount of computation.

Figure 16:
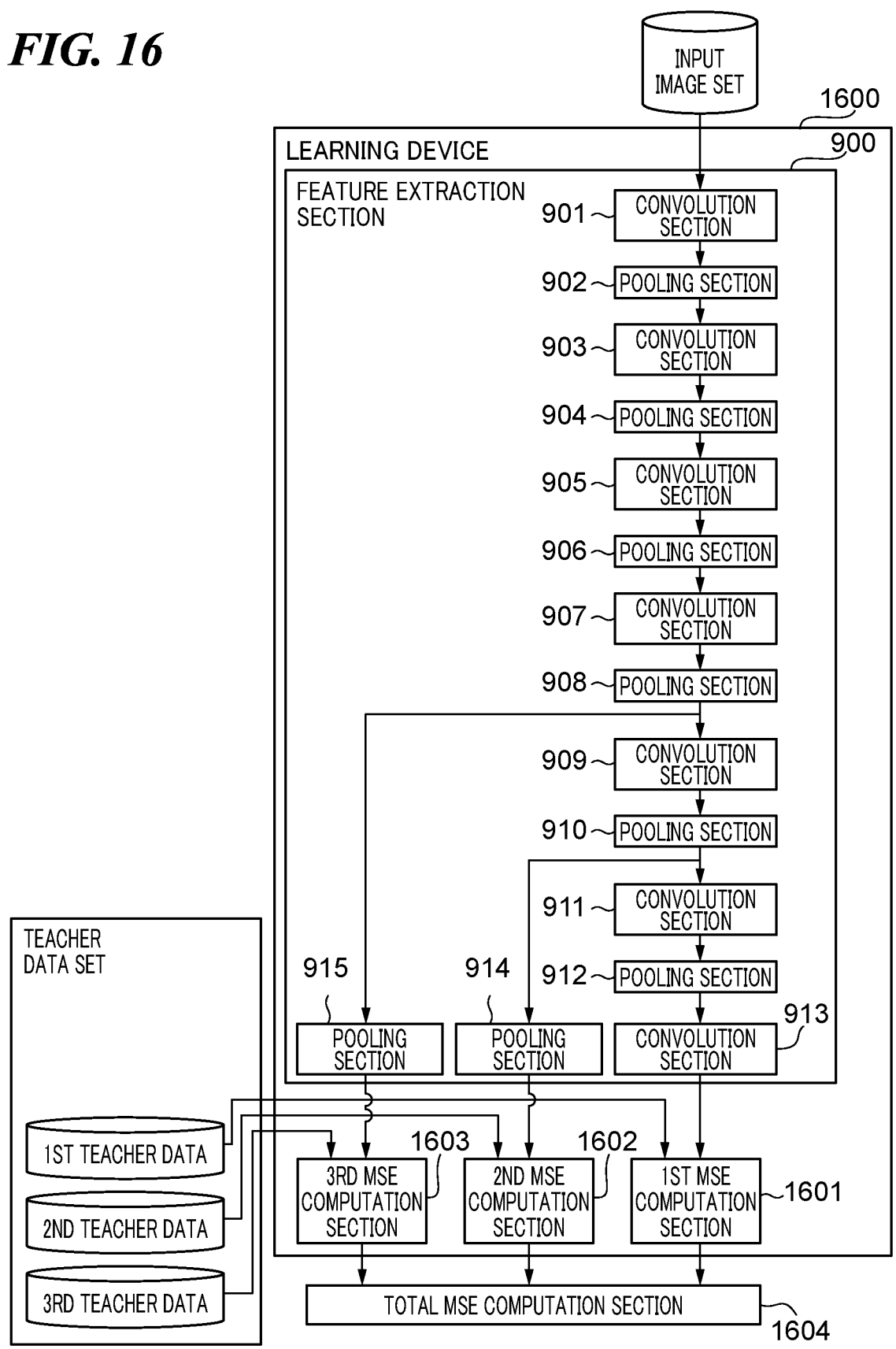
FIG. 16 is a diagram showing a learning device of a fifth embodiment.

Next, a fifth embodiment will be described. The dividing pattern determination section 101 of the fifth embodiment has the same configuration as that of the third embodiment, shown in FIG. 9. The fifth embodiment differs from the fourth embodiment in the method of machine learning. FIG. 16 is a diagram of a learning device 1600 of the fifth embodiment. The feature extraction section 900 has the same configuration as that appearing in FIG. 9. As shown in FIG. 16, the dividing pattern determination section 101 of the fifth embodiment includes not only the feature extraction section 900, but also a first MSE computation section 1601, a second MSE computation section 1602, and a third MSE computation section 1603. Data output from each MSE computation section is input to a total MSE computation section 1604. The total MSE computation section 1604 may be included in the learning device 1600. Teacher data is a specific layer feature map that indicates, on a layer basis, correct answers in which a value indicating "to be divided" is "1" and a value, indicating "not to be divided" is "0", and its form is the same as that shown in FIGS. 10A to 10C. First teacher data is associated with the first MSE computation section 1601, second teacher data is associated with the second MSE computation section 1602, and third teacher data is associated with the third MSE computation section 1603. Each teacher data and an input image for learning are associated with each other in one-to-one correspondence.

The first MSE computation section 1601 calculates a mean squared error loss 64 between the specific layer feature map of 64×64 pixels and the first teacher data. The second MSE computation section 1602 calculates a mean squared error loss 32 between the specific layer feature map of 32×32 pixels and the second teacher data. The third MSE computation section 1603 calculates a mean squared error loss 16 between the specific layer feature map of 16×16 pixels and the third teacher data. The total MSE computation section 1604 calculates a sum of losses loss_sum by the following equation (3) based on the average feature map of each layer, provided that in the following equation (3), it s assumed that "$\alpha \leq \beta \leq \gamma$" holds:

$$\text{Loss\_sum} = \alpha \times \text{loss } 64 + \beta \times \text{loss } 32 + \gamma \times \text{loss } 16 \quad (3)$$

The loss_sum may be calculated by simply summing each mean squared error. In the above equation (3), the mean squared error of the specific layer feature map of the lower layer is assigned with a weight with a higher value, and the mean squared error of the specific layer feature map of the upper layer is assigned with a weight with a lower value. The total MSE computation section 1604 calculates the sum of losses loss_sum by the equation (3).

As mentioned above, the accuracy of dividing blocks smaller in size has a larger influence on the image quality of an image than the accuracy of dividing blocks larger in size. For this reason, the total MSE computation section 1604 assigns a weight with a higher value as the layer of the specific layer feature map is deeper. The learning device 1600 performs machine learning of the neural network such that the sum of losses loss_sum, assigned with weights as described above, is made close to zero. With this, it is possible to perform machine learning by assigning importance to machine learning concerning division of blocks smaller in size which are difficult to increase the dividing accuracy. Therefore, it is possible to improve the accuracy of dividing blocks. Note that as a result of the machine learning, the learning device 1600 may search for a block size for which it was difficult to increase the dividing accuracy, and determine the above-mentioned relationship between the weights $\alpha$, $\beta$, and $\gamma$ based on a result of the search. In this case, "$\alpha \leq \beta \leq \gamma$" does not sometimes hold.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-079325, filed Apr. 28, 2020, which is hereby incorporated by reference herein in its entirety.

What is claimed is:

1. A device comprising:
   at least one processor; and
   a memory coupled to the at least one processor, the memory having instructions that, when executed by the processor, perform the operations comprising:
   inputting a first image of 64×64 pixels to a learning model and causing the learning model to generate a dividing pattern map for the first image of 64×64 pixels, the learning model having been subjected to machine learning, using images as input data and dividing pattern maps as teacher data; and
   using the dividing pattern map generated for the first image to determine one or more sizes of sub-blocks to be used for dividing the first image,
   wherein the dividing pattern map includes pieces of data corresponding to 16 prediction areas given by dividing the first image of 64×64 pixels into 4×4 blocks, respectively, and each of the pieces of data includes information indicative of which of a sub-block of 64×64 pixels, 4-division sub-blocks of 32×32 pixels, 16-division sub-blocks of 16×16 pixels, or 32-division sub-blocks of 8×8 pixels are to be used in corresponding one of the 4×4 blocks, as the sub-blocks to be used for dividing the first image.

2. The device according to claim 1, wherein the operations further comprise in a case where there is a block among the 4×4 blocks, which makes an inconsistency in the generated dividing pattern map, making a correction of the inconsistency based on the block and a plurality of blocks around the block.

3. The device according to claim 2, wherein a block to be divided into a smaller number of sub-blocks in comparison with others of the 1×4 blocks is prioritized for the correction in which the number of sub-blocks the block is divided into is increased.

4. The device according to claim 1, wherein the learning model is a neural network, and
   wherein the neural network is subjected to machine learning using back propagation.

5. The device according to claim 4, wherein the neural network includes a plurality of convolution sections and a plurality of pooling sections, and the convolution sections each convolute pixels in the 4×4 blocks with pixels around the predetermined area.

6. The device according to claim 4, wherein in a case where the neural network outputs a floating-point number, the floating-point number is converted to an integer value indicative of a size of the sub-blocks.

7. The device according to claim 1, wherein each of the images is one of images forming a moving image which is encoded based on HEVC standard.

8. A control method for a device, comprising:
   inputting a first image of 64×64 pixels to a learning model and causing the learning model to generate a dividing pattern map for the first image of 64×64 pixels, the learning model having been subjected to machine learning using images as input data and dividing pattern maps as teacher data; and
   using the dividing pattern map generated for the first image to determine one or more sizes of sub-blocks to be used for dividing the first image,
   wherein the dividing pattern map includes pieces of data corresponding to 16 prediction areas given by dividing the first image of 64×64 pixels into 4×4 blocks, respectively, and each of the pieces of data includes information indicative of which of a sub-block of 64×64 pixels, 4-division sub-blocks of 32×32 pixels, 16-division sub-blocks of 16×16 pixels, or 32-division sub-blocks of 8×8 pixels are to be used in corresponding one of the 4×4 blocks, as the sub-blocks to be used for dividing the first image.

9. The control method according to claim 8, further comprising, in a case where there is a block among the 4×4 blocks, which makes an inconsistency in the generated dividing pattern map, making a correction of the inconsistency based on the block and a plurality of blocks around the block.

10. The control method according to claim 9, wherein a block to be divided into a smaller number of sub-blocks in comparison with others of the 4×4 blocks is prioritized for the correction in which the number of sub-blocks the block is divided into is increased.

11. The control method according to claim 8, wherein the learning model is a neural network, and
    wherein the neural network is subjected to machine learning using back propagation.

12. The control method according to claim 11, wherein the neural network includes a plurality of convolution sections and a plurality of pooling sections, and the convolution sections each convolute pixels in the 4×4 blocks with pixels around the predetermined area.

13. The control method according to claim 11, wherein in a case where the neural network outputs a floating-point number, the floating-point number is converted to an integer value indicative of a size of the sub-blocks.

14. The control method according to claim 8, wherein each of the images is one of images forming a moving image which is encoded based on HEVC standard.

15. A non-transitory computer-readable storage medium which stores a program for causing a computer to execute a method, the method comprising:
  inputting a first image of 64×64 pixels to a learning model and causing the learning model to generate a dividing pattern map for the first image of 64×64 pixels, the learning model having been subjected to machine learning using images as input data and dividing pattern maps as teacher data; and
  using the dividing pattern map generated for the first image to determine one or more sizes of sub-blocks to be used for dividing the first image,
  wherein the dividing pattern map includes pieces of data corresponding to 16 prediction areas given by dividing the first image of 64×64 pixels into 4×4 blocks, respectively, and each of the pieces of data includes information indicative of which of a sub-block of 64×64 pixels, 4-division sub-blocks of 32×32 pixels, 16-division sub-blocks of 16×16 pixels, or 32-division sub-blocks of 8×8 pixels are to be used in corresponding one of the 4×4 blocks, as the sub-blocks to be used for dividing the first image.

\* \* \* \* \*